(12) United States Patent
Han et al.

(10) Patent No.: US 11,662,603 B2
(45) Date of Patent: May 30, 2023

(54) THREE-DIMENSIONAL IMAGE DISPLAY APPARATUS

(71) Applicant: HYUNDAI MOBIS CO., LTD., Seoul (KR)

(72) Inventors: Gil Won Han, Yongin-si (KR); Sun Hee Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 35 days.

(21) Appl. No.: 16/917,210

(22) Filed: Jun. 30, 2020

(65) Prior Publication Data

US 2021/0003857 A1    Jan. 7, 2021

(30) Foreign Application Priority Data

Jul. 2, 2019 (KR) .................. 10-2019-0079191

(51) Int. Cl.
*G02B 30/34* (2020.01)
*G02B 30/33* (2020.01)
*G02B 5/32* (2006.01)

(52) U.S. Cl.
CPC ............. *G02B 30/34* (2020.01); *G02B 30/33* (2020.01); *G02B 5/32* (2013.01)

(58) Field of Classification Search
CPC ........ G02B 30/34; G02B 21/22; G02B 30/33; G02B 30/20; G02B 30/22; G02B 30/35; G02B 30/36; G02B 5/32; G02B 30/52; G03H 1/26
USPC ................................ 359/475, 466, 477, 462
See application file for complete search history.

(56) References Cited

U.S. PATENT DOCUMENTS

2018/0094791 A1* 4/2018 Lee ........................... F21V 5/00

FOREIGN PATENT DOCUMENTS

| KR | 10-2013-0022900 A | 3/2013 | |
|---|---|---|---|
| KR | 20130021868 A * | 3/2013 | |
| WO | WO-2018163945 A1 * | 9/2018 | ............... G02B 5/32 |
| WO | WO-2018221091 A1 * | 12/2018 | ........... G02B 6/0016 |

* cited by examiner

*Primary Examiner* — Jade R Chwasz
(74) *Attorney, Agent, or Firm* — DLA Piper LLP (US)

(57) ABSTRACT

The three-dimensional image display apparatus includes: a housing; a light source unit which is mounted in the housing, and emits light; a single light transfer unit which is disposed in the housing to face the light source unit, and refracts, diffracts, or reflects the light emitted from the light source unit; and an image display unit which forms, as an image, the light refracted, diffracted, or reflected by the light transfer unit.

6 Claims, 5 Drawing Sheets

THREE-DIMENSIONAL IMAGE DISPLAY APPARATUS

CROSS-REFERENCE TO RELATED APPLICATION

This application claims priority from and the benefit of Korean Patent Application No. 10-2019-0079191, filed on Jul. 2, 2019, which is hereby incorporated by reference for all purposes as if set forth herein.

BACKGROUND

Field

The present disclosure relates to a three-dimensional image display apparatus, and more particularly, to a three-dimensional image display apparatus which may improve the three-dimensional effect of a holographic image.

Discussion of the Background

A hologram has a characteristic in that an image is formed only when light is incident on a hologram plate (recording paper, photopolymer) at a specific angle. For this reason, it is necessary to maintain the angle applied to the hologram plate using three or more mirrors in the existing hologram optical system.

In addition, since the image is implemented by only one hologram image (indented or protruding), only any one of the three-dimensional effect and the sharpness is limitedly selected.

The existing hologram optical system may implement a clear angle of incidence through a mirror, thereby enhancing the sharpness of the image, but there is a problem in that it is difficult to apply the existing hologram optical system to a vehicle due to an excessively long optical distance.

In addition, since the existing hologram optical system implements only one image to be indented or protrude, design limitations such as being indented with good sharpness or protruding with a good three-dimensional effect occur, and there is a problem in that it is difficult to implement image differentiation. Accordingly, there is a need to solve the above problem.

The discussion of the background of the present disclosure is disclosed in Korean Patent Application Laid-Open No. 10-2013-0022900 (published on Mar. 7, 2013 and entitled "THREE DIMENSIONAL IMAGE DISPLAY APPARATUS").

SUMMARY

The present disclosure is intended to solve the above problems, and an object of the present disclosure is to provide a three-dimensional image display apparatus which may improve the three-dimensional effect of a holographic image.

A three-dimensional image display apparatus according to the present disclosure includes: a housing; a light source unit which is mounted in the housing, and emits light; a single light transfer unit which is disposed in the housing so as to face the light source unit, and refracts, diffracts, or reflects the light emitted from the light source unit; and an image display unit which forms, as an image, the light refracted, diffracted, or reflected by the light transfer unit.

In the present disclosure, the light transfer unit includes: a light transfer fixing unit which is mounted to the housing so as to face the light source unit; and a light transfer grid unit which is formed on the light transfer fixing unit, and refracts, diffracts, or reflects the light, emitted from the light source unit, toward the image display unit.

In the present disclosure, the light transfer grid unit includes: a light transfer support unit which is vertically formed from the light transfer fixing unit toward the light source unit; and a light transfer inclination unit which is formed to be inclined at a set angle so that the light emitted from the light source unit is refracted, diffracted, or reflected toward the image display unit.

In the present disclosure, the light transfer grid unit is formed of a holographic optical element (HOE).

In the present disclosure, the image display unit includes: a plate unit which is mounted on one surface of the housing; and a film unit which is mounted on each of one surface and the other surface of the plate unit, and forms, as an image, the light emitted from the light source unit and refracted, diffracted, or reflected by the light transfer unit.

In the present disclosure, the film unit includes: a first film unit which is mounted on one surface of the plate unit, and forms a protruding image; and a second film unit which is mounted on the other surface of the plate unit, and forms an indented image.

In the present disclosure, the plate unit includes a polycarbonate (PC) material, and the film unit includes a photopolymer material.

According to the three-dimensional image display apparatus according to the present disclosure, it is possible to shorten the optical formation length compared to the existing optical apparatus, thereby displaying the three-dimensional image in the limited space.

In addition, according to the present disclosure, it is possible to reflect the light, emitted from the light source unit, to the image display unit, without additional reflective means, through the light transfer unit installed in the housing.

In addition, according to the present disclosure, it is possible to implement the indented and protruding images by the image display unit, thereby improving the three-dimensional effect.

DETAILED DESCRIPTION OF THE ILLUSTRATED EMBODIMENTS

Figure 1:
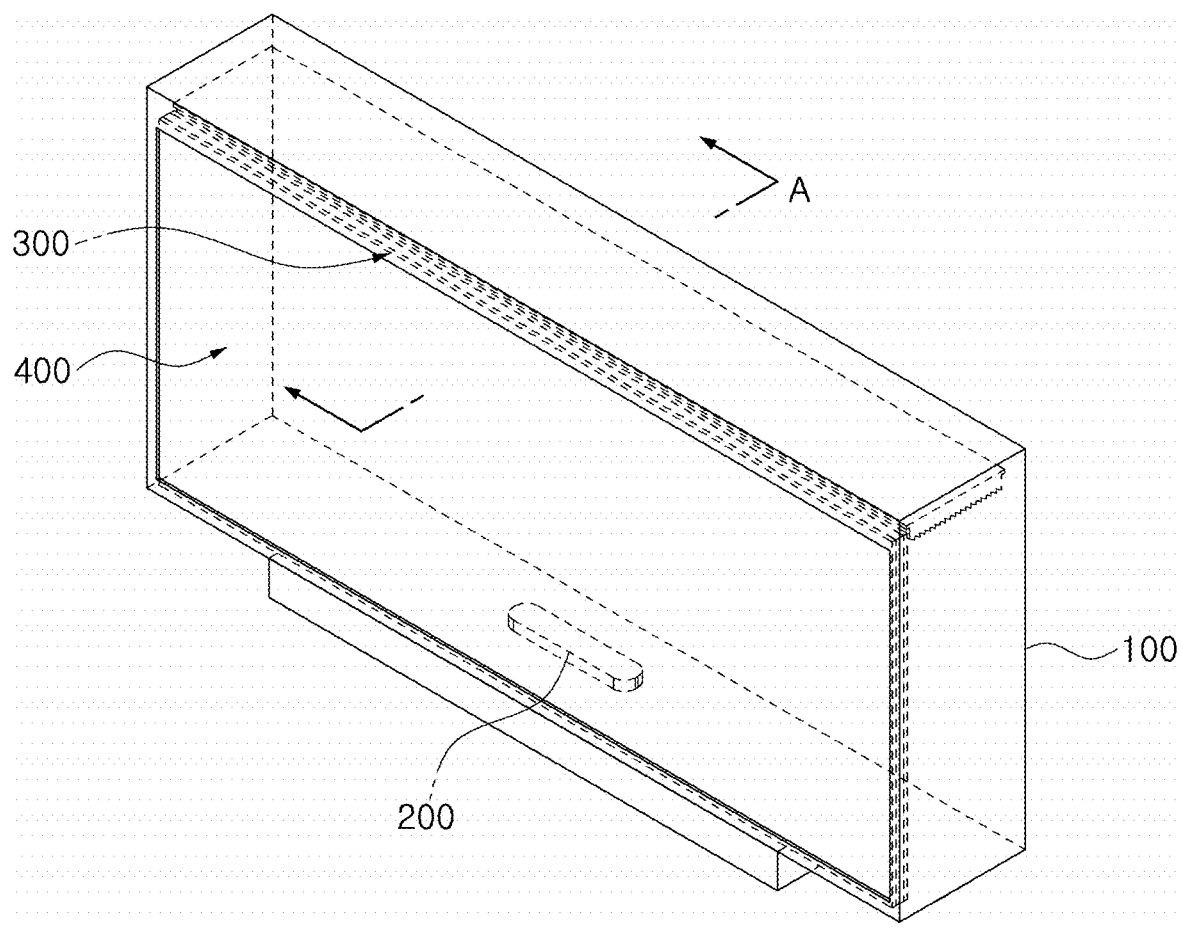
FIG. 1 is a perspective diagram schematically illustrating a three-dimensional image display apparatus according to an exemplary embodiment of the present disclosure.

Hereinafter, an exemplary embodiment of a three-dimensional image display apparatus according to the present disclosure will be described with reference to the accompanying drawings. In this process, the thickness of the lines, the size of components, or the like illustrated in the drawings may be exaggerated for clarity and convenience of the description.

In addition, terms to be described later are terms defined in consideration of functions in the present disclosure, and may vary according to a user's or operator's intention or practice. Accordingly, the definition of these terms should be made based on the contents throughout the specification.

Figure 2:
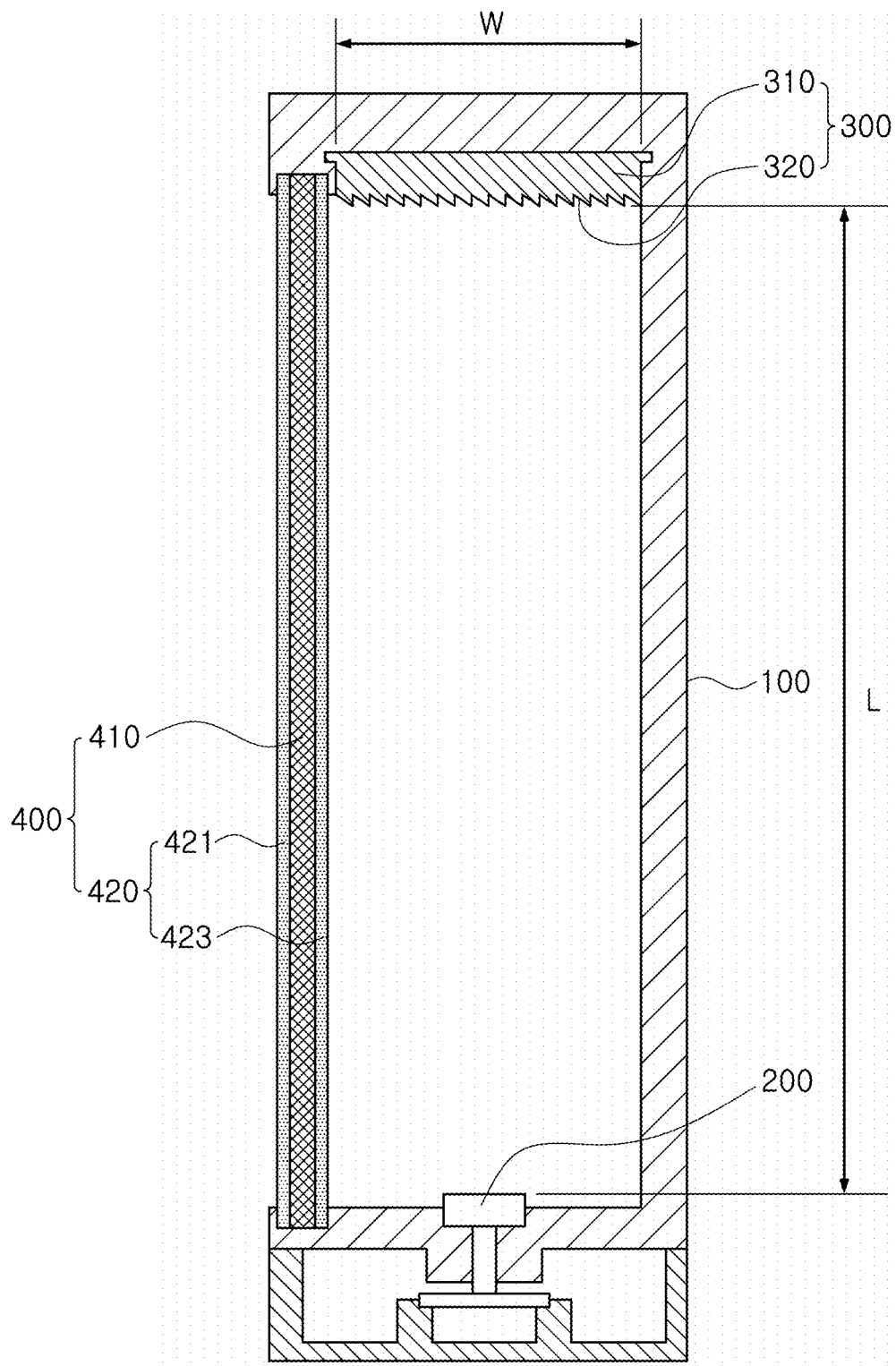
FIG. 2 is a cross-sectional diagram schematically illustrating the three-dimensional image display apparatus according to the exemplary embodiment of the present disclosure.
Figure 3:
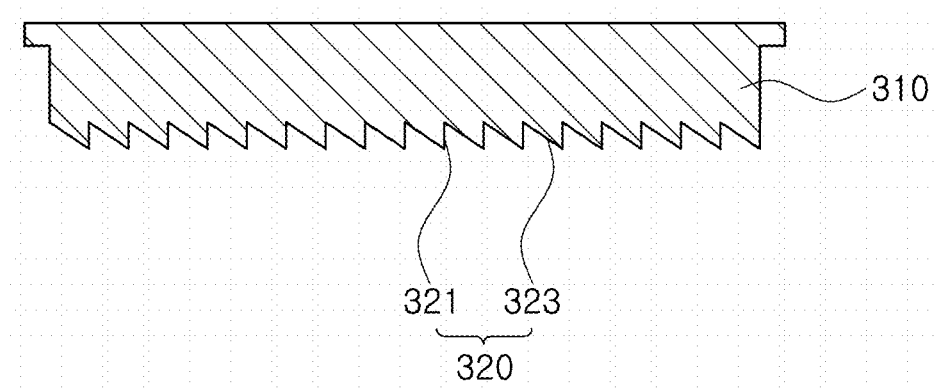
FIG. 3 is a cross-sectional diagram schematically illustrating a light transfer unit in the three-dimensional image display apparatus according to the exemplary embodiment of the present disclosure.
Figure 4:
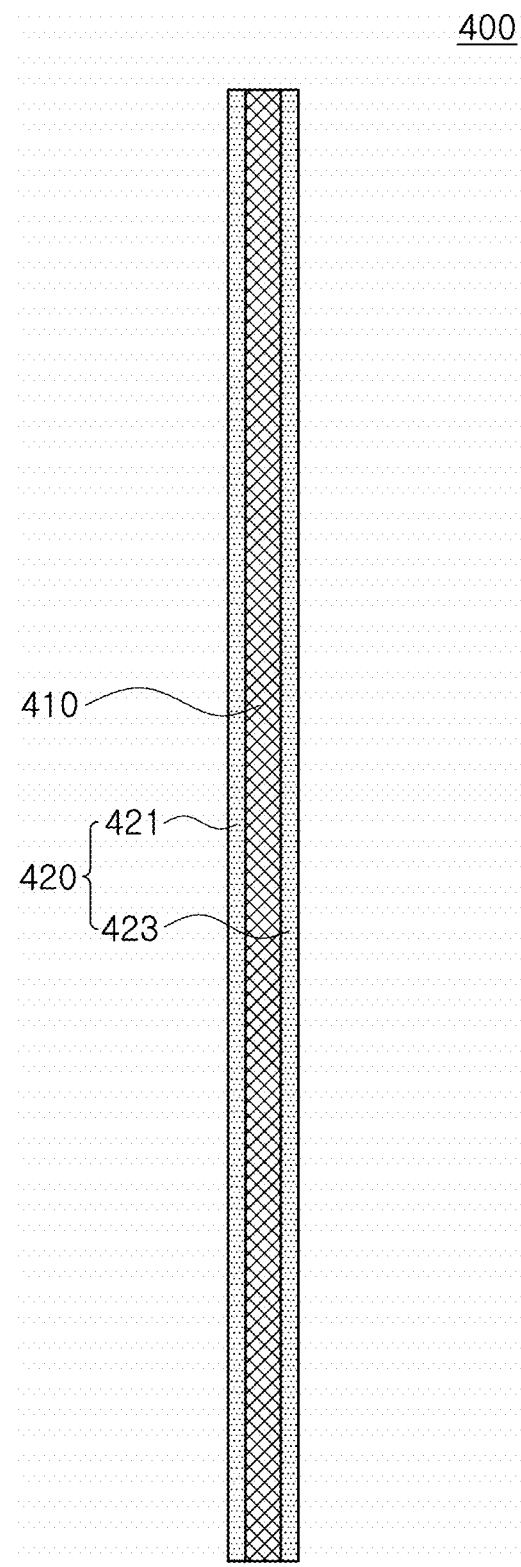
FIG. 4 is a cross-sectional diagram schematically illustrating an image display unit in the three-dimensional image display apparatus according to the exemplary embodiment of the present disclosure.
Figure 5:
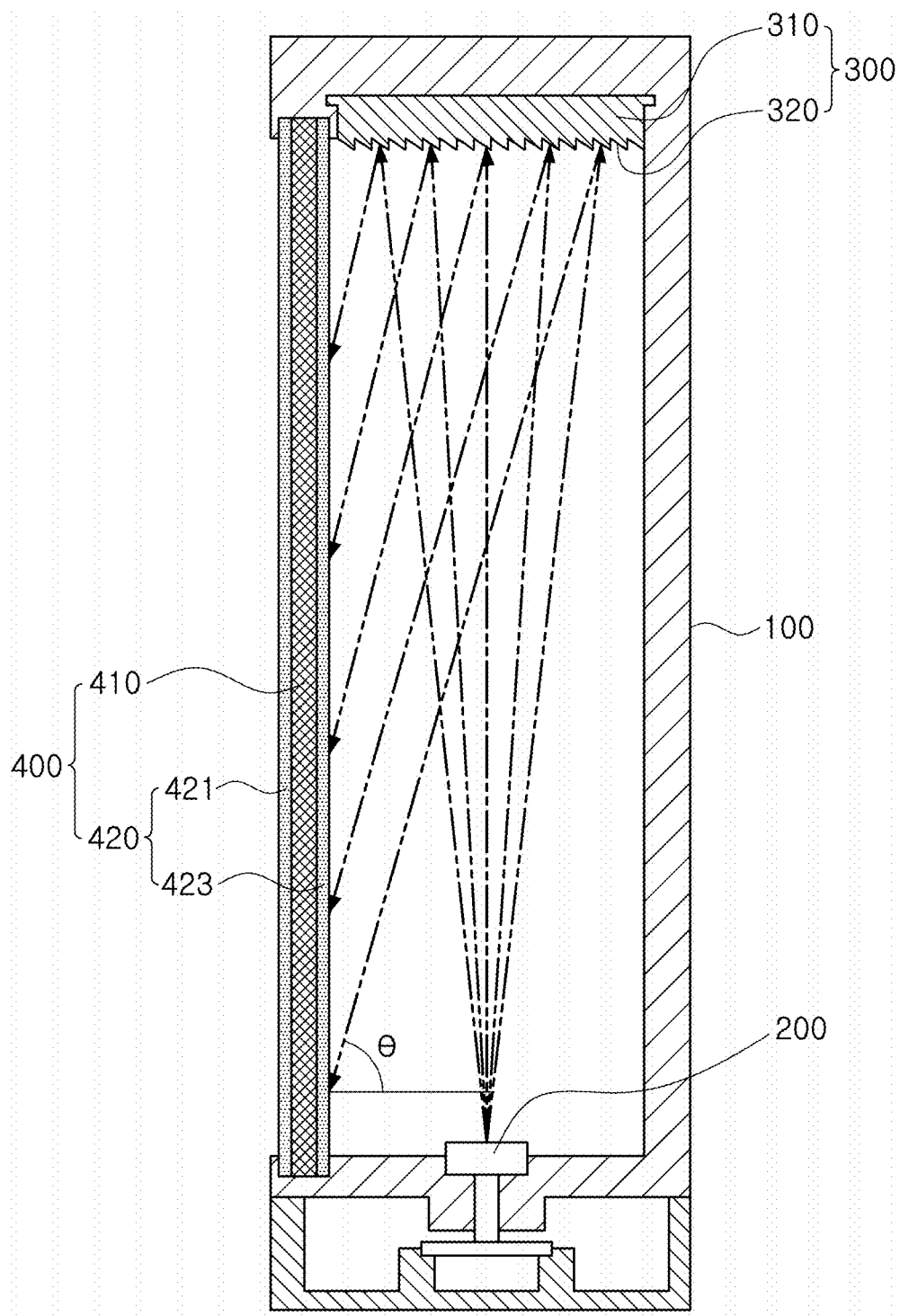
FIG. 5 is an operation diagram schematically illustrating an operation of the three-dimensional image display apparatus according to the exemplary embodiment of the present disclosure.

FIG. 1 is a perspective diagram schematically illustrating a three-dimensional image display apparatus according to an exemplary embodiment of the present disclosure, FIG. 2 is a cross-sectional diagram schematically illustrating the three-dimensional image display apparatus according to the exemplary embodiment of the present disclosure, FIG. 3 is a cross-sectional diagram schematically illustrating a light transfer unit in the three-dimensional image display apparatus according to the exemplary embodiment of the present disclosure, FIG. 4 is a cross-sectional diagram schematically illustrating an image display unit in the three-dimensional image display apparatus according to the exemplary embodiment of the present disclosure, and FIG. 5 is an operation diagram schematically illustrating an operation of the three-dimensional image display apparatus according to the exemplary embodiment of the present disclosure.

Referring to FIGS. 1 to 5, the three-dimensional image display apparatus according to the exemplary embodiment of the present disclosure includes a housing 100, a light source unit 200, a light transfer unit 300, and an image display unit 400.

The housing 100 is formed in a hexahedron shape with one surface (a front surface in FIG. 1) opened. The image display unit 400 is mounted on the opened front surface of the housing 100.

The light source unit 200 is mounted at one side (a lower side in FIG. 2) of the inner surface of the housing 100, and emits light to the other side (an upper side in FIG. 2) of the housing 100. The light source unit 200 includes a laser which emits a laser beam.

The light transfer unit 300 is disposed at the other side (an upper side in FIG. 2) of the inner surface of the housing 100 so as to face the light source unit 200, and refracts, diffracts, or reflects the light emitted from the light source unit 200 to transfer the refracted, diffracted, or reflected light to the image display unit 400. In the present disclosure, the single light transfer unit 300 is disposed in the housing 100, and the light emitted from the light source unit 200 is refracted, diffracted or reflected through one light transfer unit 300 to be directly transferred to the image display unit 400.

The light transfer unit 300 includes a light transfer fixing unit 310 and a light transfer grid unit 320. The light transfer fixing unit 310 is fixedly mounted to the housing 100 so as to face the light source unit 200 at the other side (an upper side in FIG. 2) of the housing 100. The light transfer fixing unit 310 is fixed to the inner surface of the housing 100 by bonding or bolting.

The light transfer grid unit 320 is formed on the light transfer fixing unit 310 so as to face the light source unit 200, and refracts, diffracts, or reflects the light, emitted from the light source unit 200, toward the image display unit 400.

The light transfer grid unit 320 includes a light transfer support unit 321 and a light transfer inclination unit 323. The light transfer support unit 321 is vertically formed from the light transfer fixing unit 310 toward the light source unit 200. The light transfer inclination unit 323 is formed to be inclined at a set angle so that the light emitted from the light source unit 200 is refracted, diffracted, or reflected toward the image display unit 400. In the present disclosure, the light transfer inclination unit 323 is formed to be inclined downward from one side (an upper side in FIG. 3) of the light transfer support unit 321 to the opposite side of the image display unit 400. An inclination angle of the light transfer inclination unit 323 is set so that the light emitted from the light source unit 200 may be directly transferred to the image display unit 400 through the light transfer grid unit 320 according to the size of the housing 100.

The light transfer grid unit 320 is formed of a holographic optical element (HOE). The image display unit 400 may form, as a three-dimensional holographic image, the light which is refracted, diffracted or reflected from the holographic optical element (HOE) of the light transfer grid unit 320 which is a predefined and irregularly arranged element. The light transfer grid unit 320 refracts, diffracts, or reflects the light, incident from the light source unit 200, at a set reflective angle.

Here, a reflective angle (8) of the light transfer grid unit 320 is formed to be 75°. A width (W) of the light transfer grid unit 320 is set as 30 mm, and a distance (L) from the light source unit 200 to the light transfer grid unit 320 is set as 100 mm. The housing 100 is formed according to this standard, so that the passenger may comfortably watch the holographic three-dimensional image in a vehicle with a limited space.

The image display unit 400 forms the light, which is refracted, diffracted, or reflected by the light transfer unit 300, as a holographic three-dimensional image. The image display unit 400 is mounted on the opened one surface (the front surface in FIG. 1) of the housing 100. A location where the image display unit 400 is mounted is disposed toward the passenger.

The image display unit 400 includes a plate unit 410 and a film unit 420. The plate unit 410 is mounted on the opened one surface (the front surface in FIG. 1) of the housing 100. The plate unit 410 is made of a transparent material. In the present disclosure, the plate unit 410 includes a polycarbonate (PC) material. The plate unit 410 including the polycarbonate material transmits the light which is emitted from the light source unit 200 and refracted, diffracted or reflected by the light transfer unit 300.

The film unit 420 is mounted on each of one surface (a left surface in FIG. 2) and the other surface (a right surface in FIG. 2) of the plate unit 410, and forms, as an image, the light which is emitted from the light source unit 200 and refracted, diffracted or reflected by the light transfer unit 300.

The film unit 420 includes a photopolymer material. The film unit 420 including the photopolymer material is a polymer compound which changes from a monomer to a polymer as the light is emitted from the light source unit 200 through the light transfer unit 300. The photopolymer may record the light intensity distribution of the light source unit 200 as a refractive index distribution.

The film unit 420 includes a first film unit 421 and a second film unit 423. The first film unit 421 is mounted on one surface (the left surface in FIG. 2) of the plate unit 410, and forms a protruding image. The second film unit 423 is mounted on the other surface (the right surface in FIG. 2) of the plate unit 410, and forms an indented image.

The first film unit 421 and the second film unit 423 form the protruding and indented images, respectively, so that the holographic three-dimensional image may be more three-dimensionally expressed to the passenger. Alternatively, in the present disclosure, the first film unit 421 and the second film unit 423 may be disposed opposite to the aforementioned arrangement with respect to the plate unit 410.

An operation of the three-dimensional image display apparatus according to the exemplary embodiment of the present disclosure will be described with reference to FIG. 5.

The light is emitted from the light source unit 200 disposed at one side (a lower side in FIG. 5) of the housing 100 to the light transfer grid unit 320 of the light transfer unit 300 disposed at the other side (an upper side in FIG. 5) of the housing 100.

The light emitted from the light source unit 200 is transferred to the image display unit 400 while being refracted, diffracted or reflected by the light transfer grid unit 320. At this time, the reflective angle (8) of the light transferred from the light transfer grid unit 320 to the image display unit 400 follows the set angle.

Protruding and indented holographic images may be formed by the first film unit 421 and the second film unit 423 of the image display unit 400 to provide a three-dimensional image to the passenger.

According to the three-dimensional image display apparatus according to the present disclosure, it is possible to shorten the optical formation length compared to the existing optical apparatus, thereby displaying the three-dimensional image in the limited space.

In addition, according to the present disclosure, it is possible to reflect the light, emitted from the light source unit, to the image display unit, without additional reflective means, through the light transfer unit installed in the housing.

In addition, according to the present disclosure, it is possible to implement the indented and protruding images by the image display unit, thereby improving the three-dimensional effect.

Although the present disclosure has been described with reference to the exemplary embodiment illustrated in the drawings, this is only exemplary, and those skilled in the art to which the present disclosure pertains will understand that various modifications and equivalent other exemplary embodiments therefrom are possible. Accordingly, the true technical protection scope of the present disclosure will be defined by the appended claims.

What is claimed is:

1. A three-dimensional image display apparatus comprising:
   a housing comprising a first side and a second side, the second side being opposite the first side;
   a light source unit which is mounted on the first side of the housing, and emits light;
   a single light transfer unit which is disposed on the second side of the housing so as to face the light source unit, and refracts, diffracts, or reflects the light emitted from the light source unit; and
   an image display unit which forms an image directly from the light refracted, diffracted, or reflected by the light transfer unit, wherein the image display unit comprises:
      a first film unit which is mounted on one surface of a plate unit, and forms a protruding image; and
      a second film unit which is mounted on an opposite surface of the plate unit, and forms an indented image, wherein the protruding image and the indented image form a three-dimensional image.

2. The three-dimensional image display apparatus of claim 1, wherein the light transfer unit comprises:
   a light transfer fixing unit which is mounted to the housing to face the light source unit; and
   a light transfer grid unit which is formed on the light transfer fixing unit, and refracts, diffracts, or reflects the light, emitted from the light source unit, toward the image display unit.

3. The three-dimensional image display apparatus of claim 2, wherein the light transfer grid unit comprises:
   a light transfer support unit which is vertically formed from the light transfer fixing unit toward the light source unit; and
   a light transfer inclination unit which is formed to be inclined at a set angle so that the light emitted from the light source unit is refracted, diffracted, or reflected toward the image display unit.

4. The three-dimensional image display apparatus of claim 2, wherein the light transfer grid unit is formed of a holographic optical element (HOE).

5. The three-dimensional image display apparatus of claim 1, wherein the image display unit comprises:
   the plate unit which is mounted on one surface of the housing; and
   a film unit which is mounted on each of one surface and the other surface of the plate unit, and forms, as an image, the light which is emitted from the light source unit and refracted, diffracted, or reflected by the light transfer unit.

6. The three-dimensional image display apparatus of claim 5, wherein the plate unit comprises a polycarbonate (PC) material, and wherein the film unit comprises a photopolymer material.

* * * * *